G. TAUSSIG.
EXHIBITING MACHINE.
APPLICATION FILED MAR. 19, 1921.
1,411,759.
Patented Apr. 4, 1922.
3 SHEETS—SHEET 3.
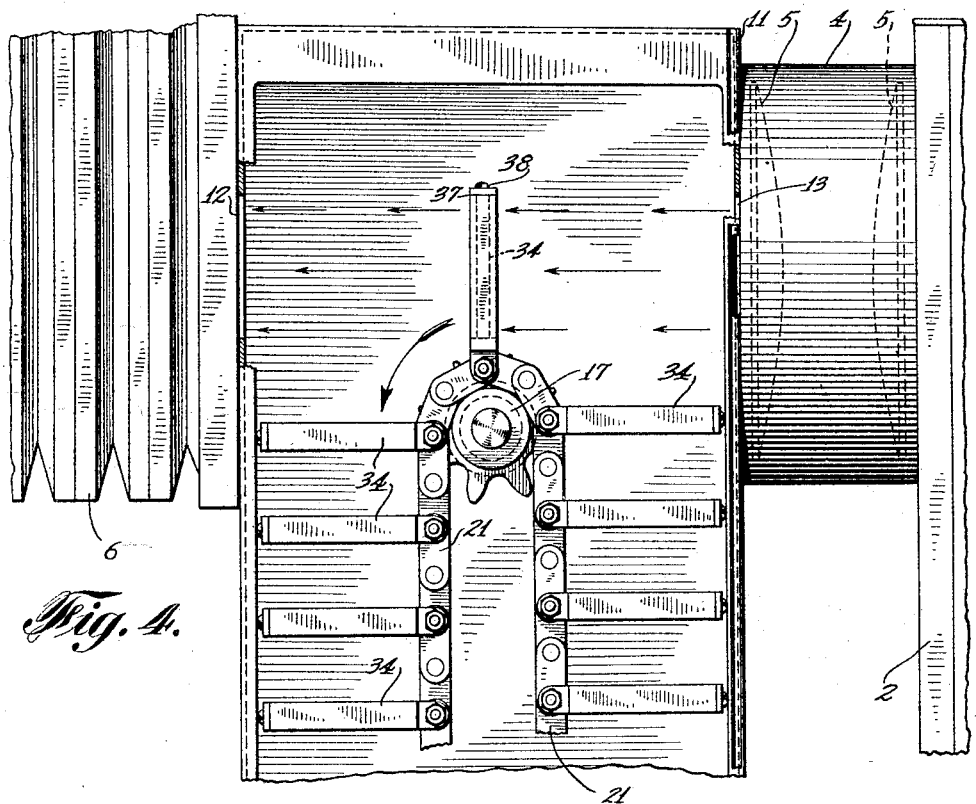
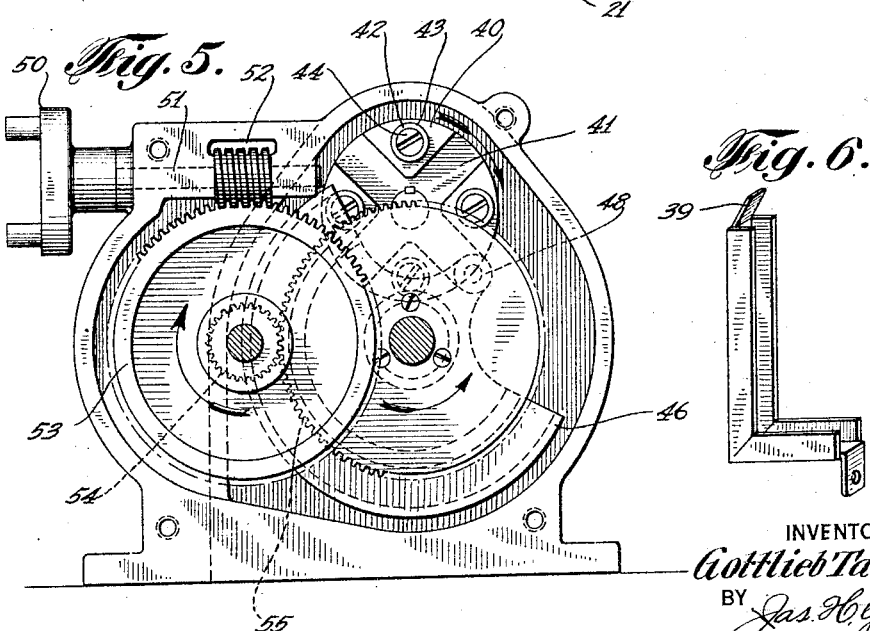
INVENTOR
Gottlieb Taussig
BY
Jas. H. Griffin
ATTORNEY

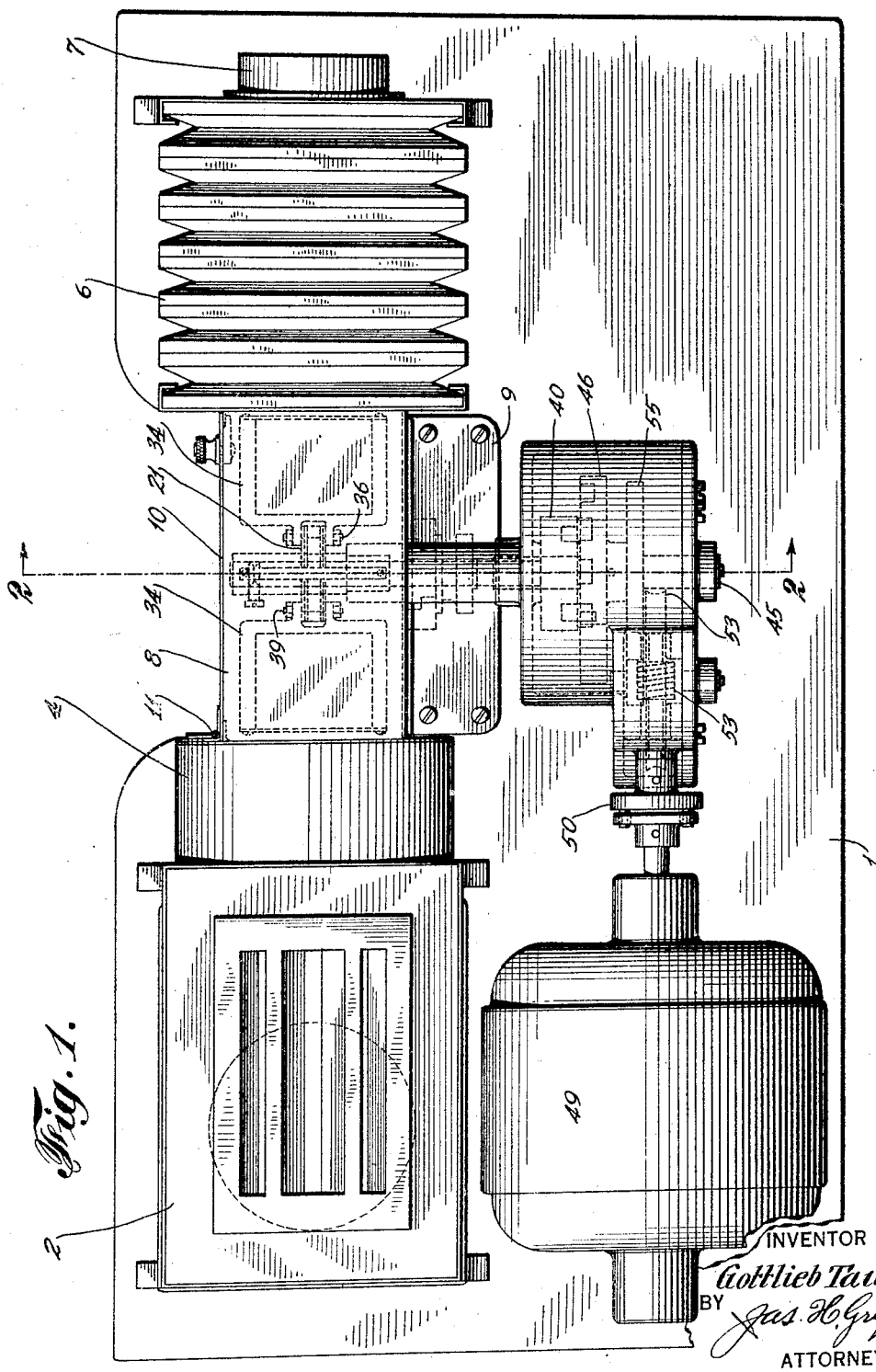

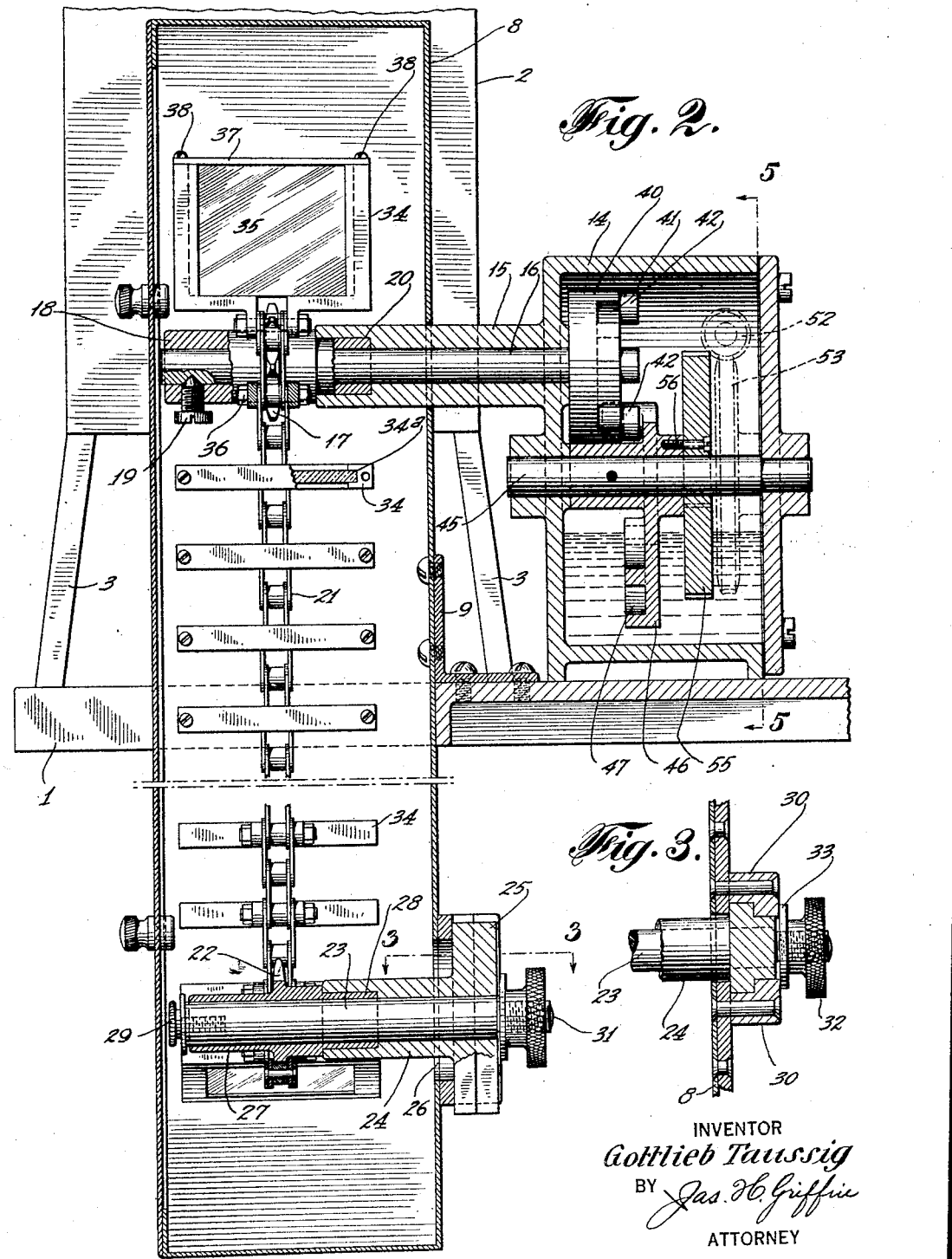

UNITED STATES PATENT OFFICE.

GOTTLIEB TAUSSIG, OF NEW YORK, N. Y., ASSIGNOR TO VALERIE TAUSSIG AND EMIL TAUSSIG, BOTH OF NEW YORK, N. Y.

EXHIBITING MACHINE.

1,411,759. Specification of Letters Patent. Patented Apr. 4, 1922.

Application filed March 19, 1921. Serial No. 453,559.

*To all whom it may concern:*

Be it known that I, GOTTLIEB TAUSSIG, a citizen of the United States, residing at New York city, borough of Bronx, in the county of Bronx and State of New York, have invented a certain new and useful Exhibiting Machine, of which the following is a specification.

This invention is an exhibiting machine adapted to successively display a plurality or series of picture or advertising slides, and embodies projecting mechanism, whereby the slides may be projected upon a screen.

The salient novel feature of the invention resides in the mounting of a plurality or series of transparent slides firmly upon a travelling member or members, hereinafter referred to in the singular, which member is caused to travel and successively position the slides in cooperative relation to the projecting mechanism.

It has been the prior practice in exhibiting a series of slides to mount them in a magazine for sliding movement and means is associated with such magazine to move the slides one by one from the magazine and into cooperative relation with the projecting apparatus. These prior devices manifestly require the employment of complicated mechanisms to accomplish this result and these mechanisms are apt to get out of order or fail to properly operate.

In carrying out the present invention in its preferred form, the slides are supported in picture or slide holders which are rigidly secured to a travelling member which may conveniently partake of the form of an endless sprocket chain passing over spaced sprockets. The slide holders are firmly and rigidly secured to the sprocket chain and the sprockets over which the chain passes are so positioned that when the sprockets are rotated, the pictures are successively brought into cooperative relation with the projecting mechanism.

A further and important feature of the invention consists in novel means for effecting travel of the sprocket chain in such manner that as soon as the slide is brought into projecting position, it is caused to remain stationary in this position while the projecting operation is carried out, after which said slide is moved to a non-exhibiting position and the next slide simultaneously brought into exhibiting position. This mechanism for bringing the slides into and out of exhibiting position in succession and holding them steady during exhibiting is highly efficient in practice and constitutes an important practical feature of the machine of the present invention.

Features of the invention, other than those specified, will be apparent from the hereinafter detailed description and claims, when read in conjunction with the accompanying drawings.

The accompanying drawings illustrate different practical embodiments of the invention, but the constructions therein shown, are to be understood as illustrative, only, and not as defining the limits of the invention.

Figure 1 is a plan view of an exhibiting machine embodying the present invention.

Figure 2 is a section in the plane of the line 2—2 of Figure 1.

Figure 3 is a fragmental section taken on the line 3—3 of Figure 2.

Figure 4 is a fragmental elevation of the upper central portion of the machine showing the back cover plate or door removed.

Figure 5 is a section on the line 5—5 of Figure 2; and,

Figure 6 is a perspective detail of a modified form of slide holder section.

Referring to the drawings, 1 designates the base or table of the machine. Positioned on one end of the table and at one side thereof, is a lamp housing 2 which is supported on legs 3 and contains any suitable form of lighting means. The lamp housing may be of any conventional form so long as it supplies sufficient light to carry out the projecting operation.

Mounted on the forward end of the lamp housing is a casing 4 in which are mounted suitable condenser lenses 5 and positioned in alinement with the housing and condenser lenses, but spaced from the latter is a bellows 6 carrying focusing lenses 7 at its forward end, so that light passing through the condenser lenses from the lamp housing and through the focusing lenses 7 may be properly focused by adjustment of the bellows 6 in the usual manner.

Positioned intermediate the bellows 6 and the casing 4 of the condenser lenses, is a casing 8. This casing is shown as of elongated rectangular form. It is positioned in upstanding relation and extends downwardly to a point below the table 1 as clearly shown in Figure 2, being firmly secured to the table by means of an angle bracket 9. All sides of this casing except the back are closed and the upper back is normally closed by a door or cover 10 hinged at 11, see Figure 1. Light passing from the lamp housing through the condenser lenses and through the focus lenses passes through alined openings 12 and 13 in the opposite sides of the casing 8 and through the upper portion of such casing after the manner shown in dotted lines partaking of the path shown by the straight arrows shown in Figure 4.

Positioned on the table 1 along side of the casing 8 is a housing 14, which is firmly secured to the table and this housing is provided at its back with a long tubular boss 15. This boss extends through an aperture in the adjacent side of the casing 8 and into the interior of such casing and forms a channel or bearing for a shaft 16 on which a sprocket 17 is secured. The sprocket construction is clearly shown in Figure 2, wherein the sprocket is shown as provided with a hub 18 having an axial opening through which the shaft 16 extends. The hub 18 is secured against rotation to the shaft 16 by a set screw 19 and one end of the hub is reduced and fits into a socket 20 in the end of the boss 15. The sprocket thus fixed to the shaft 16 is mounted for rotation and such rotation is imparted thereto by means presently to be described.

Passing over the sprocket 17 is an endless sprocket chain 21 which also passes about a second sprocket 22. This second sprocket 22 is positioned at the lower portion of the casing 8 and is mounted for rotation on a stub shaft 23. The stub shaft 23 is in turn supported by a cylindrical boss 24, extending from the back of a slide 25 through a vertical slot 26 formed in the wall of the casing 8. The stub shaft 23 has in practice a forced fit with the boss 24, so that such stub shaft is secured against rotation within the boss. The hub 27 of the sprocket 22 is mounted for rotation on the stub shaft 23 and has a reduced end projecting into a socket 28 in the free end of the boss 24. Longitudinal movement of the sprocket on the stub shaft 23, however, is precluded by a stop screw 29 which threads into the end of the stub shaft and is provided with a sufficiently large head to hold the hub of the sprocket in position.

The slide 25 hereinbefore referred to is provided with stepped lateral edges as shown in Figure 3 and these stepped lateral edges are embraced by guides 30, which are riveted to the casing, after the manner shown in Figure 3. The stub shaft projects through the slide 25 and has a reduced outer end 31 adapted to receive a thumb nut 32 which acts against a washer 33. When the thumb nut is loosened, the slide may be moved longitudinally between the guides 30, in order to effect proper tensioning of the sprocket chain 21 and when just the proper tension has been obtained, the thumb nut 32 is tightened thereby forcing the washer 33 against the adjacent faces of the guides 30 to frictionally lock the parts in place.

Mounted at spaced distances along the sprocket chain and projecting outwardly therefrom, are a plurality of frames or slide holders 34, in each of which is positioned a slide 35. These slides may contain any matter which it is desired to exhibit and they may be held in position within the holders in any desired way. Moreover, the holders may be constructed in any suitable manner and of any material, and may be secured to the sprocket chain by any convenient method. However, for the purpose of illustration, I have shown in Figure 1 a one piece or U-shaped frame and in Figure 2 a slide holder formed in two sections, each of which is substantially L-shaped and is provided on its interior with a slot 34$^a$. Two of these L-shaped sections are shown as bolted together in complementary relation by a bolt 36 which passes through the chain, and, in practice, these bolts are adapted to firmly and rigidly support the frame sections upon the chain so that the frames are at all times held in outstanding positions, as shown in Figures 2 and 4. The bolts employed in this construction are stepped down and threaded at both ends, so that a nut may be screwed on each end to clamp the slide holder in position. However, instead of the bolts, I may employ rivets, if desired. In the construction of Figures 2 and 4, the sections of the frame are shown as castings and the slides are maintained in the frame by a plate 37, which extends across the upper side of the frame and is secured in place by screws 38.

I do not wish in any manner to restrict myself to a cast frame or a frame of the particular character shown in Figures 1, 2 and 4. In practice, any desired type of frame may be employed and if desired sheet metal frames stamped up in two sections after the manner shown in Figure 6 may be used to advantage. The frame section of Figure 6 has the advantage of being light and, may be provided with an integral tab or finger 39 adapted to be bent over after the slide is in position to hold such slide against falling out.

When a plurality of slides are supported on an endless sprocket chain in the manner described, it will be apparent that when intermittent rotation is imparted to the sprocket 17, the chain will be caused to intermittently advance and in the machine the parts are so regulated that the chain is advanced step by step to bring the slides successively into the path of the projected light beam. Figure 4 graphically illustrates this operation, and in this figure one of the slides is shown in exhibiting position with the chain at rest. The uppermost slide will remain in such exhibiting position until the next movement of the chain which will serve to move the exhibited slide into non-exhibiting position and the next successive slide into exhibiting position. This operation will be repeated as the mechanism continues to function through the driving of the chain intermittently by the employment of the means next to be described.

Mounted on the outer end of the shaft 16 which carries a sprocket 17 is a disc 40 which will be hereinafter termed a cam disc. This disc is provided in its forward face with radial grooves or cam tracks 41 and the intermediate raised portions of such face are provided with projections 42. These projections 42 may conveniently partake of a form of rollers 43 secured in position by means of machine screws 44.

Mounted for rotation on the opposite walls of the housing 14 is a spindle 45 having its axis parallel to the axis of the shaft 16. On this spindle 45 is fixed the hub of a segmental plate 46 and in the face of this plate adjacent the cam disc 40 is formed an arcuate track or channel 47 of a cross sectional area appropriate to receive the rollers 43 of the cam disc. The plate 46 also carries a roller 48 of an appropriate size to operate within the radial cam tracks or channels 41 of the cam disc. The plate 46 is so shaped and its channel 47 and roller 48 are so positioned that when rotation is imparted to the spindle 45, the following operation will result.

Looking at Figure 5, it will be apparent that after the plate 46 is rotated from the position shown in a clockwise direction, the roller 48 of such plate will enter and traverse one of the cam tracks 41. That is to say, it will move through the cam track into which it enters towards the axis of rotation of the cam disc 40, and in so doing will manifestly impart rotation to the cam disc. The roller 44 will move radially of the cam disc until such roller passes over dead center whereupon continued rotation of the plate 46 will cause the roller to partake of the same path in a retrograde direction. However, through its entire movement in both directions, the cam disc will be rotated, so that by the time the roller 48 leaves the cam track 41, the disc will have been rotated through 90 degrees. Moreover, as the roller 48 leaves the cam track, the advanced end of the channel 47 will embrace one of the rollers 42 of the cam disc, and as the rotation of the plate 46 continues, the advanced end of such channel also embraces the diametrically opposite roller of the disc. These two rollers are maintained in the embrace of the channel 47 through the remainder of one complete rotation of the plate 46 or until the roller 48 is about to enter the next cam track of the disc, whereupon the rollers of the disc will be disengaged from the channel 47 of the plate to permit of rotation of the disc.

The arrangement described has the function of intermittently rotating the shaft 16 and positively locking such shaft against rotation between such intermittent rotary operations, since it would be manifest that so long as one or both of the rollers 43 of the disc are within the channel 47 of the plate, the slightest rotary movement of the shaft is precluded. Through the mechanism described, the rotation of the plate 46 will serve to intermittently bring the slides into exhibiting position and will positively hold them rigidly in exhibiting position during periods of rest or dwell.

Any suitable means may be employed for imparting rotation to the plate 46, but, in practice, this may be efficiently accomplished by using a motor 49 as a prime mover. This motor is shown as mounted on the table 1 and its armature shaft is connected through a clutch 50 with the stub shaft 51 on which is fixed a worm 52. The worm meshes with and drives a worm wheel 53 rigid with which is a coaxial spur gear 54. The spur gear 54 in turn meshes with and drives a gear 55 which is fixed to the hub of the plate 46 by means of screws 56, as shown in Figure 2.

In operating the machine of the present invention, it is only necessary to turn on the power to the motor 49 and the source of light within the lamp housing, whereupon the motor will act through the reducing gearing described to rotate the plate 46, which will in turn intermittently rotate the sprocket 17 for the purpose of successively and intermittently bringing the slides into the path of the projected beam of light. The machine is entirely automatic in its operation, and will continue to exhibit the slides until the power is turned off.

The machine of this invention may be employed to exhibit slides embodying advertising matter, pictures or any other subject matter desired, and has been found to be of pronounced utility in window advertising because of its compact form, entirely automatic manner of operation and its ability to operate through extended periods without requiring any adjustment or becoming out of order.

Having thus fully described the invention, what I claim as new and desire to secure by Letters Patent is:

1. An exhibiting machine embodying projecting mechanism, a sprocket chain comprising links pivoted to one another, a plurality of slides rigidly mounted on certain pivots of said chain, and carried thereby, and means for intermittently operating the chain to successively bring the slides into exhibiting position and momentarily hold the individual slides in such exhibiting postion.

2. An exhibiting machine embodying projecting mechanism, a pair of spaced toothed sprockets, one of which is positioned adjacent the path of light of the projecting mechanism, a sprocket chain meshing with and passing over the spaced toothed sprockets, and a plurality of slides rigidly mounted on the sprocket chain, in combination with means for intermittently effecting travel of the chain to bring the slides successively into the path of light of the projecting mechanism and adapted to hold the slides stationary for a time while in such exhibiting position.

3. An exhibiting machine embodying projecting mechanism, a sprocket chain supported for movement along an endless path, a plurality of slides carried by the pivots of the sprocket chain, a prime mover operable at a constant speed, and connections between the prime mover and the sprocket chain to intermittently advance the chain to bring the slides successively into exhibiting position and to firmly hold the slides stationary while in exhibiting position.

4. An exhibiting machine embodying projecting mechanism, a carrier mounted for movement along an endless path, and a plurality of slides rigidly mounted on the carrier, in combination with means for operating the carrier, embodying a plurality of toothed sprocket wheels, meshing with the carrier, a prime mover operable at a constant speed, and connections between the prime mover and the toothed sprocket wheels to periodically advance the carrier for the purpose of bringing the slides successively into exhibiting position and for firmly and rigidly holding the carrier against movement while the slides are in exhibiting position.

5. An exhibiting machine embodying projecting mechanism, an endless sprocket chain, and a plurality of picture slides rigidly mounted at spaced intervals along the sprocket chain, in combination with means for periodically shifting the sprocket chain with intermediate periods of rest or dwell to bring the slides successively into exhibiting position with respect to the projecting mechanism, said means embodying a prime mover operable at a constant speed, a toothed sprocket wheel meshing with the sprocket chain, and operative connections between the prime mover and the toothed sprocket wheel to intermittently operate the driven member and periodically lock the driven member against operation.

6. An exhibiting machine embodying projecting mechanism, an endless carrier, and a plurality of picture slides rigidly mounted at spaced intervals along the carrier, in combination with a rotary member associated with the carrier and provided with radial slots and a series of coaxial projections, a rotary plate cooperable with the rotary member and provided with an annular channel cooperating with the projections of the rotary member and with a projection cooperating with the channels of the rotary member, a prime mover operable at a constant speed and operative connections between the prime mover and the rotary plate to impart rotation to said plate, whereby the projection and the channel of the plate alternately cooperate with the radial channels and projections of the rotary member to intermittently drive the rotary member and to hold the rotary member against rotation at times when it is not being driven by the rotary plate.

7. An exhibiting machine embodying projecting mechanism, and endless sprocket chain, a plurality of spaced sprockets with which the chain meshes and about which the chain operates, means for moving one of the sprockets to properly tension the chain for operation, and a plurality of slides rigidly mounted on the chain and carried thereby, in combination with means for effecting travel of the chain to successively bring the slides into exhibiting position with respect to the projecting mechanism.

8. An exhibiting machine embodying projecting mechanism, a plurality of sprockets, a sprocket chain passing about and meshing with said sprockets, a drive shaft on which one of the sprockets is adjustably mounted and carried, a plurality of slides rigidly mounted on the chain and carried thereby, and driving means associated with the drive shaft for effecting movement of the sprocket chain to bring the slides successively into exhibiting position relative to the projecting mechanism and to momentarily hold the individual slides in such exhibiting position, in combination with means for adjustably securing the drive sprocket to the drive shaft to permit of longitudinal adjustment of the chain to effect proper positioning of the slides while in exhibiting position.

9. A carrier for use in exhibiting machines embodying an endless sprocket chain comprising a plurality of links pivoted to one another, a plurality of picture slides mounted on pivots of the sprocket chain at spaced intervals longitudinally thereof and so fixed to pivots that said slides will be rigidly supported in perpendicular relation to the carrier at all times.

10. A carrier for use in exhibiting machines embodying an endless sprocket chain, slide holders secured to certain links of said chain in such manner as to be rigid with the links to which they are secured, whereby the slide holders are maintained at all times in perpendicular relation to the links of the chain to which they are respectively attached.

11. A slide holder for exhibiting machines embodying two sections, each of which is substantially L-shaped and is provided on its interior with a channel adapted to receive the slide, and a tab carried by each section and adapted to be bent inwardly over the exposed edge of the slide to maintain the slide firmly in position.

12. An exhibiting machine embodying projecting mechanism, a carrier mounted for movement along an endless path, and a plurality of slide holders mounted on the carrier, each of said slide holders comprising two sections, each of which is substantially L-shaped, and is provided on its interior with a channel, shaped to receive the slide, and means for securing the slides in the channel of said sections.

13. An exhibiting machine embodying projecting mechanism, an endless sprocket chain mounted for movement along an endless path, a plurality of slide holders mounted on the chain, and adapted to be brought through movement thereof, successively, into exhibiting position, with respect to the projecting mechanism, each of said slide holders embodying a pair of co-operating sections, and means for securing each pair of sections on the chain, and for simultaneously maintaining the sections of each pair against relative tilting movement with respect to one another.

14. A carrier for use in exhibiting machines embodying an endless sprocket chain comprising a plurality of links pivoted to one another, in combination with slide holders, carried by said chain, each of which embodies a pair of complementary slide holding sections held in co-operative relation to one another, and rigidly secured to the chain by means of the pivots which maintain the links of the chain in assembled relation.

15. An exhibiting machine embodying projecting mechanism, a sprocket chain supported for movement along an endless path and comprising links pivoted to one another, slide holders rigidly supported on the chain by every second pivot thereof, so that the alternate pivots of the chain carry slide holders, and means for intermittently moving the chain to successively bring the slide holders into exhibiting position, with respect to the projecting mechanism.

16. An exhibiting machine embodying projecting mechanism, a sprocket chain comprising a plurality of links pivoted to one another, a toothed sprocket wheel with which the chain meshes and by which said chain is driven, slide holders mounted on the chain by certain pivots of said chain, leaving the remaining pivots unencumbered, and means for intermittently driving the toothed sprocket wheel with intermediate periods of rest or dwell to successively move the slide holders into exhibiting position with respect to the projecting mechanism.

17. An exhibiting machine embodying projecting mechanism, a sprocket chain, a plurality of slides mounted on and carried by the sprocket chain, a toothed sprocket gear meshing with said chain, a shaft on which said sprocket gear is mounted and by which said gear is driven, and means for adjustably securing the sprocket gear on the shaft for the purpose of permitting accurate adjustment of the chain, so that the slides will be properly positioned with respect to the projecting mechanism when in exhibiting position, whereby a perfect focus is secured.

In testimony whereof, I have signed my name to this specification.

GOTTLIEB TAUSSIG.